(12) United States Patent
Jaccino

(10) Patent No.: US 9,203,979 B1
(45) Date of Patent: Dec. 1, 2015

(54) SYSTEM FOR OPERATING A WIRELESS DEVICE IN AN ENVIRONMENT WITH AMBIENT NOISE

(75) Inventor: Michael Colin Jaccino, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 510 days.

(21) Appl. No.: 12/939,844

(22) Filed: Nov. 4, 2010

(51) Int. Cl.
*H04M 19/04* (2006.01)
*H04M 1/725* (2006.01)

(52) U.S. Cl.
CPC ........ *H04M 19/044* (2013.01); *H04M 1/72577* (2013.01)

(58) Field of Classification Search
CPC ............................ G06F 3/0484; H04M 19/044
USPC .................................................. 455/418, 419
See application file for complete search history.

(56) References Cited

U.S. PATENT DOCUMENTS

| | | | |
|---|---|---|---|
| 2006/0195540 A1* | 8/2006 | Hamilton et al. | 709/206 |
| 2006/0217159 A1* | 9/2006 | Watson | 455/563 |
| 2008/0188268 A1* | 8/2008 | Kim et al. | 455/566 |
| 2009/0147973 A1* | 6/2009 | Gitzinger et al. | 381/190 |
| 2011/0103598 A1* | 5/2011 | Fukui et al. | 381/57 |
| 2011/0177800 A1* | 7/2011 | Gilson | 455/417 |

\* cited by examiner

*Primary Examiner* — Olumide T Ajibade Akonai
*Assistant Examiner* — Edward Zhang
(74) *Attorney, Agent, or Firm* — Benjamin A. Balser; Balser & Grell IP Law

(57) ABSTRACT

A method of operating a wireless device in an environment with ambient noise is disclosed. The wireless device includes a microphone and is configured to operate in both a voice mode and a non-voice mode such as text mode. In operation, the wireless device receives an indication of an attempted incoming call. Prior to causing the wireless device to generate a user-perceptible indication of the incoming call, the device determines whether an ambient noise parameter exceeds a predetermined threshold based on an ambient noise volume received by the microphone. When the ambient noise parameter exceeds the predetermined threshold, the wireless device switches to text mode and sends an indication that the wireless device is operating in text mode to the wireless service. The wireless device is operated in the voice mode when the ambient noise does not exceed the predetermined threshold.

13 Claims, 2 Drawing Sheets

SYSTEM FOR OPERATING A WIRELESS DEVICE IN AN ENVIRONMENT WITH AMBIENT NOISE

BACKGROUND OF THE INVENTION

1. Field of the Invention

The present invention relates to wireless communications devices and, more specifically, to a system for wireless devices configured to detect an ambient noise level.

2. Description of the Related Art

Occasionally, a user of a wireless device will receive a call when in a loud environment with a high level of ambient noise, such as on a trading floor, in a manufacturing facility or at the site of an emergency. It can be quite difficult to take phone calls in such an environment, since the user is often unable to hear the caller. Also, when the ambient noise level exceeds the loudness thresholds for which the microphone on the wireless device was intended, the caller will have difficulty hearing the person being called.

One approach to ambient noise control is through the use of noise cancellation. According to this technique, a processor generates a noise signal which has the same amplitude as an ambient noise signal but with an inverted phase. The signals combine to form a new signal in which both the ambient noise signal and the inverted noise signal cancel each other out. However, noise cancellation devices tend to only reduce the effect of noise and can not compensate completely for high levels of ambient noise. Therefore, even with noise cancellation technology, it is often hard to hear a caller to a mobile device in high ambient noise conditions.

Wireless communication services may be equipped to employ presence information in their services. Presence information provides status indications regarding the availability of one user of a service to other users of the service. In many cases, each user has the ability to designate which other users are allowed to receive such status information. The status information can be as simple as an indication of whether a wireless device is turned on and ready to receive a call. The status information may also be more complicated and may include information about the local operating parameters of the wireless device.

Many wireless communication systems permit user provisioning of wireless accounts. With such systems, a user is allowed to access an Internet-based account to control the operating parameters of a wireless communications device. Currently, for example, some services allow a user to restrict certain types of calls and to generate notifications upon the occurrence of certain events (such as an account balance exceeding a predetermined amount).

The ability to adequately hear calls in certain environments can be critical. Substantial losses can be realized as a result of not being able to communicate effectively via mobile phones. In certain circumstances, such as in a medical emergency application, miscommunication can result in substantial harm.

Therefore, there is a need for a system that facilitates communication between wireless devices in noisy environments.

SUMMARY OF THE INVENTION

The disadvantages of the prior art are overcome by the present invention which, in one aspect, is a method of operating a wireless communications device having an input microphone that determines when an ambient noise parameter exceeds a predetermined threshold based on an ambient noise volume received by the microphone. A mode of operation of the wireless communications device is changed to a high noise mode when the ambient noise parameter exceeds a predetermined threshold.

In another aspect, the present invention is a method of operating a wireless device having an input microphone and configured to operate in both a voice mode as well as in a non-voice or non-audio mode such as in a text mode. The wireless device is also configured to be in communication with a wireless service. In the method, an indication that a call is being received by the wireless device is received. Prior to causing the wireless device to generate a user-perceptible indication of an incoming call, the device determines whether an ambient noise parameter exceeds a predetermined threshold based on an ambient noise volume received by the microphone. An indication that the wireless device is operating in a non-voice mode such as in a text mode is transmitted to the wireless service when the ambient noise parameter exceeds the predetermined threshold. The wireless device is operated in the voice mode when the ambient noise does not exceed the predetermined threshold.

In yet another aspect, the present invention is a method of operating a wireless service that includes a server that is in communication with a wireless device, in which a call request for a first wireless device is received from a second device. A call indicator is transmitted to the first wireless device. An indication from the first wireless device which communicates whether the first wireless device is operating in a high noise mode is received. When the indication indicates that the first wireless device is operating in a high noise mode, then a text mode protocol between the first wireless device and the second device is initiated. Otherwise a voice mode protocol between the first wireless device and the second device is initiated.

In yet another aspect, the present invention is a wireless communications device that includes a microphone, a wireless communications circuit, and a processor. The processor is configured to receive an incoming call indicator from a wireless service and detect a noise parameter at the microphone. When the noise parameter exceeds a predetermined threshold, the processor transmits a high noise mode indicator to the wireless service. The processor generates a user-perceptible indication of an incoming call and executes a voice mode protocol when the noise parameter does not exceed the predetermined threshold.

These and other aspects of the present invention will become apparent from the following description of the preferred embodiments taken in conjunction with the following drawings. As would be obvious to one skilled in the art, many variations and modifications of the invention may be affected without departing from the spirit and scope of the novel concepts of the disclosure.

DETAILED DESCRIPTION OF THE INVENTION

Figure 1:
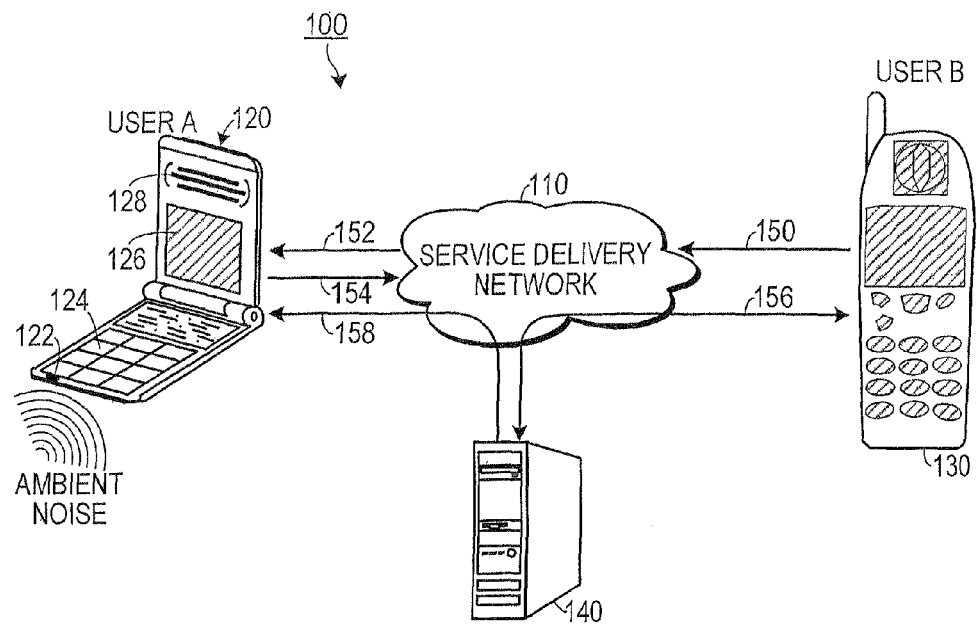
FIG. 1 is a schematic diagram showing a first embodiment of a system for operating a wireless device in an environment with ambient noise.

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIG. 1, one embodiment includes a wireless communications system 100 that facilitates communication between at least a first wireless communications device 120 (such as a mobile telephone) and a second communications device 130 (which can also be a wireless device) via a telecommunications service delivery network 110 that is administered by a server 140. The first wireless device includes a microphone 122, a keypad 124, a text display screen 126, an audio output device 128 (such as a speaker) and a processor (not shown).

Generally, the wireless communications device 120 determines when an ambient noise parameter exceeds a predetermined threshold (e.g., the ambient noise level is too high) based on an ambient noise volume received by the microphone 122. If the ambient noise parameter exceeds a predetermined threshold, then the wireless communications device 120 changes its mode of operation to a high noise mode. When in the high noise mode of operation, several different things could occur depending upon the sophistication of the system and the user's preferences. For example, when in the high noise mode, the wireless communications device 120 could simply switch from sending only an audible incoming call notification (e.g., a ring) to adding a vibrating incoming call notification, or increasing the amplitude of the vibration. Similarly, the wireless communications device 120 could generate a light signal to indicate the receipt of a call, or it could simply ring louder than normal. In one embodiment, the user records different messages corresponding to different noise-level environments and the wireless communications device 120 or the server 140 is programmed to play to incoming callers a selected message corresponding to a given noise level when the device is operating in an environment corresponding to that noise level.

In another embodiment, the wireless communications device 120 instructs a voicemail service 110 to divert all incoming calls to voicemail, or it instructs the caller to send text messages. In certain embodiments, the system is user-provisionable so that the user of the wireless communications device 120 can select which actions are to be taken when in a high noise mode. Also, in certain embodiments, more than one loudness threshold may be employed so that different actions can be taken by the wireless communications device 120 or the voicemail service 110 (or both) in response to different ambient noise levels. For example, the wireless communications device 120 could automatically answer an incoming call in a non-voice based mode such as text mode, or the wireless communications device 120 could answer an incoming call in voice mode but compensate for the nature and degree of background noise by automatically adjusting the audio output device 128 by increasing speaker volume or modify certain frequency ranges so as to better hear on the wireless communications device 120.

In one representative embodiment, when the second device 130 attempts to call the first wireless device 120 by sending a call request 150 to the service delivery network 110, the first wireless device 120 is notified of the incoming call 152. Prior to generating a user-perceptible indication of the call, the first wireless device 120 detects the ambient noise level at the microphone 122. This would typically be done by taking one or more samples during a predetermined amount of time. If the ambient noise level exceeds a noise threshold during the predetermined amount of time, then the wireless device transitions or switches to a non-voice mode such as text mode and sends a high noise mode indicator 154 to the service delivery network 110. The high noise mode indicator 154 indicates that the first wireless device is operating in a text mode due to the high ambient noise level. If the noise level does not exceed the threshold, then an ordinary voice communications protocol is established between the first wireless device 120 and the second device 130. It will be clear to those skilled in the art that in addition to text messaging, several other options exist for non-voice based communications when the wire device is in a high ambient noise environment, such as video, instant messaging, and email, for example.

When the service delivery network 110 determines that the first wireless device 120 is operating in text mode, it diverts 156 the communication with the second device to a voicemail server 140, wherein the user of the second device 130 leaves a voicemail message for the first wireless device 120. The voicemail server 140 transforms the voicemail message into a text message, by conventional techniques known to those skilled in the art, and transmits it 158 to the first wireless device 120.

In one scenario according to this embodiment, user A is a subscriber with wireless communications device 120 as disclosed herein. When User A is in a high noise environment and when User B, calling from the second device 130, calls User A, the service delivery network 110 signals to wireless communications device 120 that a call is incoming. Prior to ringing, User A's device 120 tests for high loudness. Instead of ringing, User A's device 120 signals to the network delivery service 110 to divert the call to voicemail. The voicemail from User B is then recorded, converted to text, and sent to User A's device 120 in the form of a short message, a text message, or an instant message.

Figure 2:
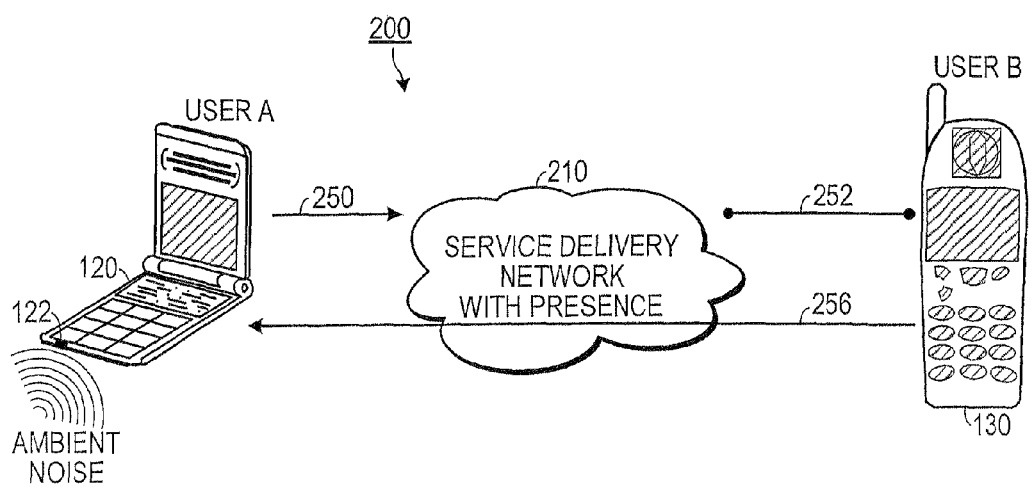
FIG. 2 is a schematic diagram showing a second embodiment of a system for operating a wireless device in an environment with ambient noise.

In another embodiment, as shown in FIG. 2, the first wireless device 120 periodically samples the ambient noise level and publishes its noise mode status 250 to the service delivery network 210 in the form of presence information. The second device 130 has pre-established access to the noise mode status of the first wireless device 120. When the second device 130 desires to initiate a call with the first wireless device 120, it checks the noise mode status of the first wireless device 120. If this noise mode status is "high noise mode," then the second device indicates to the user that the first wireless device 120 is not accepting voice-based communications and is only accepting non-voice-based communication such as text messages, for example. The user of the second device 130 then transmits a text message 256 to the first wireless device 256 via the service delivery network 210.

Figure 3:
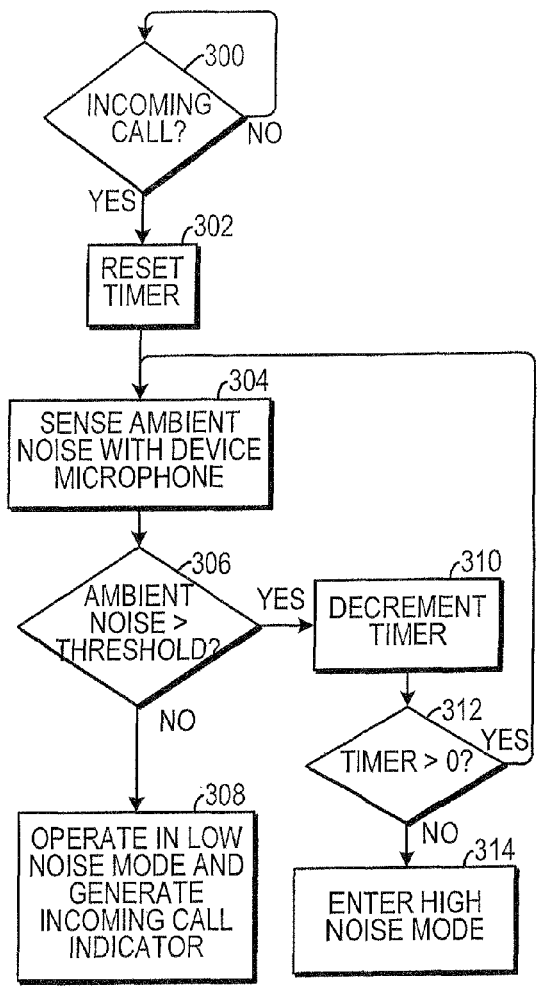
FIG. 3 is a flow chart showing one embodiment of a method employed by a wireless device receive an incoming call.

As shown in FIG. 3, in one method executed by the processor in the first wireless device 120 an incoming call is detected 300. The processor resets a timer 302 to a predetermined value and then senses the ambient noise at the microphone 304 is reset. If the ambient noise is not greater than a predetermined noise level threshold 306, then the device operates in a low noise mode 308 and generates a user-perceptible incoming call indicator (e.g., a ring or a vibration). However, if the ambient noise level is greater than the threshold, the timer is decremented 310, then a test 312 is performed to determine if the time has run out. If not, (i.e., there is still time remaining on the timer) then the ambient noise is sensed again 304, otherwise the processor enters the high noise mode 314. In the high noise mode 314, the wireless device will only accept non-audio based communications such as text messaging.

Figure 4:
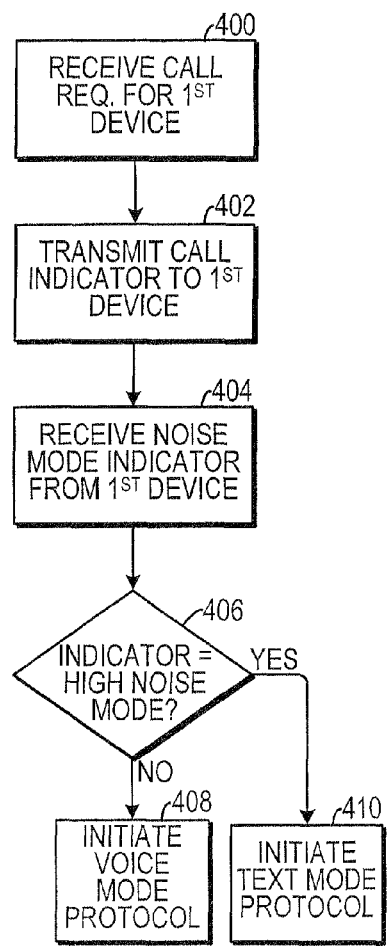
FIG. 4 is a flow chart showing one embodiment of a method employed by a wireless service to administer an incoming call.

As shown in FIG. 4, in one method of operating the service delivery network 110, the network server receives a call request for the first wireless device 400 and transmits a call indicator to the first wireless device 402. The server receives a noise mode indicator 404 from the first wireless device and determines if the first wireless device is in a high noise mode 406. If not, then the server initiates a voice mode protocol call 408 between a second device and the first wireless device. Otherwise, it causes the two devices to communicate in a non-voice, text mode protocol.

The mobile phone, or other communications device, detects that the user is in a loud environment and influences call scenarios to encourage non-voice communication. More generically, a noise threshold may be used to determine that the user's context has changed sufficiently to change the device's behavior.

Loudness detection is performed by the device itself by using the microphone to test the environment for high loudness. Each device may be engineered for different environments, so each device is typically capable of determining whether the loudness of the environment meets the thresholds necessary to qualify as an excessively noisy environment. When this threshold has been met, the device has reached a predetermined excessive loudness threshold (ELT).

The test for loudness may be performed at predetermined intervals, or it may be performed in response to other events. For example, if the device determines that the user's context has changed, it may perform the test in response thereto. Likewise, the network might trigger a test. Detection may also occur when an initial call is received.

In certain environments, high ambient noise may be experienced for only brief periods. For example, a bus passing a pedestrian may exceed the ELT. If the device were to detect and took action to influence the user's communication profile based on a single sample, it may take action more frequently than the user intended. Such a scenario may be called "flutter." Such flutter can be prevented through an algorithm where multiple samples must be taken before the ELT can be said to be exceeded.

In one scenario, under this embodiment, User B has a pre-established view of User A's device 120 service availability. This would be through the use of a standardized method of sharing such information, such as OMA presence, 3GPP Presence, or XMPP Presence. In this scenario, User A's device 120 publishes that it supports voice and short message (text) communication services state information, and that it is available. Initially, User A's device 120 senses that loudness is normal, and the device publishes its capabilities to the service delivery network's presence service 210, which makes this information available to other user devices (such as User B's device 130). After a certain amount of time has passed, the noise environment changes and User A's device 120 detects that the high loudness threshold has been exceeded. User A's device 120 than publishes an update regarding its state information to the presence service 210. In one scenario, this state information indicates that User A's device 120 supports only non-audio based communication such as short message (text) communication and that the device 120 is available.

The presence service 210 provider sends an update to User B's device 130 indicating the change in User A's device 120 status. When User B wishes to contact User A, User B looks up User A in the device's 130 contact list. User B sees that the only available method for contacting User A is via non-audio based communication such as short message (text) and that User A's device 120 is not available for live, voice-based communication. User B then sends User A a text message. User A receives the text message from User B and is able understand the message, even though User A is in a noisy environment.

The system disclosed herein allows users of wireless communications devices to operate more effectively in high noise environments. For example, the system would prevent an emergency worker operating in a high noise environment from misunderstanding critical information. Similarly, a trader on a noisy exchange floor would not misunderstand trade orders using the system disclosed herein.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A method of operating a wireless device having an input microphone and configured to operate in both a voice mode and non-voice mode, the wireless device further configured to be in communication with a wireless service, comprising the steps of:
   a. receiving an indication that a call is being received by the wireless device;
   b. receiving an indication when an ambient noise parameter exceeds a predetermined threshold for a predetermined amount of time based on an ambient noise volume received by the microphone prior to causing the wireless device to generate a user-perceptible indication of an incoming call; and
   c. transmitting to the wireless service an indication that the wireless device is operating in a non-voice text mode when the ambient noise parameter exceeds the predetermined threshold and operating the wireless device in the voice mode when the ambient noise does not exceed the predetermined threshold; and
   d. transmitting to the wireless service an indication that the wireless device is operating in voice mode upon termination of the call.

2. The method of claim 1, further comprising the step of generating the user-perceptible indication of an incoming call after the determining step.

3. The method of claim 1, wherein the transmitting step further comprises instructing the wireless service to divert all incoming calls to voicemail and to convert each voicemail to a text message.

4. The method of claim 1, wherein the transmitting step further comprises instructing the wireless service to indicate to an initiator of a call to the wireless device that the wireless device will not receive voice mode calls but will receive text messages.

5. A method of operating a wireless service that includes a server that is in communication with a wireless device, comprising the steps of:
   a. receiving a call request for a first wireless device from a second device;
   b. transmitting a call indicator to the first wireless device;

c. receiving an indication from the first wireless device of whether the first wireless device is operating in a high noise mode; and d. when the indication indicates that the wireless device is operating in a high noise mode indicated by an ambient noise parameter exceeding a threshold greater than a predetermined level for a predetermined amount of time, then initiating a text mode protocol between the first wireless device and the second device, otherwise initiating a voice mode protocol between the first wireless device and the second device; and e. transitioning the first wireless device to voice mode protocol upon termination of the communication.

6. The method of claim 5, wherein in the text mode protocol the server executes steps comprising:

a. receiving a voice message from the second device; b. transforming the voice message into a text message; and c. transmitting the text message to the first wireless device.

7. The method of claim 5, wherein in the text mode protocol the server executes the step of indicating to the second device that the first wireless device is operating in a text mode and instructing the second device to send the first wireless device a text message.

8. The method of claim 5, wherein the second device comprises a wireless communications device.

9. A wireless communications device, comprising: a. a microphone; b. a wireless communications circuit; and c. a processor, the processor configured to execute the following operations: i. receive an incoming call indicator from a wireless service; ii. detect a noise parameter at the microphone; iii. transmitting to the wireless service a high noise mode indicator when the noise parameter exceeds a predetermined threshold for a predetermined amount of time and transitioning back to a voice mode protocol upon termination of a call; and iv. generating a user-perceptible indication of an incoming call and executing a voice mode protocol when the noise parameter does not exceed the predetermined threshold.

10. The wireless communications device of claim 9, wherein when the noise parameter exceeds the predetermined threshold, the wireless service diverts all incoming calls to voicemail and converts each voicemail to a text message.

11. The wireless communications device of claim 9, wherein when the noise parameter exceeds the predetermined threshold, the wireless service indicates to an initiator of a call that the wireless device will not receive voice mode calls but will receive text messages.

12. The wireless communications device of claim 9, wherein the wireless communications device comprises a mobile telephone.

13. The method of claim 5, wherein the processor is further configured to transition the first wireless device to a voice mode upon termination of the call.

\* \* \* \* \*